(12) United States Patent
Lehmann et al.

(10) Patent No.: US 12,654,768 B2
(45) Date of Patent: *Jun. 16, 2026

(54) SYSTEM AND METHOD FOR INFLUENCING STEERING CHARACTERISTICS

(71) Applicant: Deere & Company, Moline, IL (US)

(72) Inventors: Philipp Lehmann, Homburg (DE);
Julian Daubermann, Stuttgart (DE)

(73) Assignee: DEERE & COMPANY, Moline, IL (US)

( * ) Notice: Subject to any disclaimer, the term of this patent is extended or adjusted under 35 U.S.C. 154(b) by 109 days.

This patent is subject to a terminal disclaimer.

(21) Appl. No.: 18/828,435

(22) Filed: Sep. 9, 2024

(65) Prior Publication Data

US 2024/0425106 A1      Dec. 26, 2024

Related U.S. Application Data

(62) Division of application No. 16/382,828, filed on Apr. 12, 2019, now Pat. No. 12,084,135.

(30) Foreign Application Priority Data

Apr. 13, 2018    (DE) ............................. 102018205674
Apr. 9, 2019    (EP) .................................... 19168220

(51) Int. Cl.
*A01B 69/00*        (2006.01)
*B62D 6/00*        (2006.01)
(52) U.S. Cl.
CPC ............ *B62D 6/001* (2013.01); *A01B 69/007* (2013.01); *B62D 6/007* (2013.01)

(58) Field of Classification Search
CPC .... A01B 69/007; B62D 5/008; B62D 5/0469; B62D 6/00; B62D 6/001; B62D 6/007
See application file for complete search history.

(56) References Cited

U.S. PATENT DOCUMENTS 6,226,579 B1    5/2001  Hackl et al.
6,389,343 B1*   5/2002  Hefner ................... B62D 5/006
                                                        180/443

(Continued)

FOREIGN PATENT DOCUMENTS

DE      102009044998 A1    3/2011
EP          2014504 B1     6/2010
EP          3351080 A1     7/2018

OTHER PUBLICATIONS

European Search Report issued in counterpart application No. 19168220.2, dated Sep. 23, 2019.

*Primary Examiner* — Matthew J. Reda
(74) *Attorney, Agent, or Firm* — McDonald Hopkins LLC; James P. Muraff

(57)          ABSTRACT

A method for influencing the steering characteristics of an agricultural tractor is disclosed. The method comprises associating a steering characteristic with a respective parameter set of a plurality of predetermined parameter sets. Detecting an instantaneous working condition of the agricultural tractor by a control unit. Selecting a parameter set from the plurality of predetermined parameter sets based on the detected instantaneous working condition; and activating an actuating device based on the selected parameter set to adapt a steering characteristic to the detected instantaneous working condition.

8 Claims, 2 Drawing Sheets

(56)　　　　　　References Cited

U.S. PATENT DOCUMENTS

| | | | |
|---|---|---|---|
| 8,594,891 B2 | 11/2013 | Harder | |
| 8,972,113 B2 | 3/2015 | Seto et al. | |
| 9,950,735 B2 | 4/2018 | Barthomeuf et al. | |
| 2004/0238300 A1* | 12/2004 | Cherney | B62D 5/005 |
| | | | 188/267 |
| 2005/0209752 A1 | 9/2005 | Ono et al. | |
| 2006/0060410 A1* | 3/2006 | Potts | B62D 7/026 |
| | | | 180/408 |
| 2006/0201737 A1 | 9/2006 | Fleck et al. | |
| 2009/0143941 A1 | 6/2009 | Tarasinski et al. | |
| 2009/0188226 A1* | 7/2009 | Carlson | B62D 6/008 |
| | | | 56/10.2 R |
| 2010/0004825 A1 | 1/2010 | Nakano et al. | |
| 2014/0081524 A1 | 3/2014 | Tamaizumi et al. | |
| 2014/0343791 A1 | 11/2014 | Suzuki | |
| 2015/0336609 A1 | 11/2015 | Smith et al. | |
| 2016/0159391 A1* | 6/2016 | Fischer | B62D 6/00 |
| | | | 180/422 |
| 2018/0237062 A1 | 8/2018 | Saal et al. | |
| 2018/0362076 A1 | 12/2018 | Rowell et al. | |
| 2019/0315394 A1 | 10/2019 | Lehmann | |

* cited by examiner

SYSTEM AND METHOD FOR INFLUENCING STEERING CHARACTERISTICS

RELATED APPLICATIONS

This application is a divisional of U.S. Utility application Ser. No. 16/382,828 filed on Apr. 12, 2019 which claims priority to European Application No. 19168220.2 filed on Apr. 9, 2019, which claims priority to German Application No. 102018205674.9, titled "Method for Influencing the Steering Characteristics of an Agricultural Tractor," filed Apr. 13, 2018, each of which are hereby incorporated by reference in their entireties.

FIELD OF THE DISCLOSURE

The present disclosure relates generally to steering systems, and more particularly to a system and method for influencing the steering characteristics of an agricultural tractor.

BACKGROUND OF THE DISCLOSURE

The targeted influencing of the steering characteristics of a vehicle steering system has long been known from the automotive field under the name "parameter steering." In such conventional systems, the steering transmission ratio of a steering wheel provided for driver-side operation of the vehicle steering is typically adapted based on driving-dynamics factors, usually the instantaneous travel speed of the vehicle. This adaptation is done such that stable driving behavior is maintained in the event of inadvertent steering wheel operations at relatively high travel speeds on a superhighway. Drawbacks to such systems include decreased steering accuracy, for example, based on limited speed selections for various working conditions and applications. As such, there is a need in the art for an improved system and method that optimizes steering performance and increases steering accuracy.

SUMMARY OF THE DISCLOSURE

According to an aspect of the present disclosure, a method for influencing the steering characteristics of an agricultural tractor is provided. The method comprises associating a steering characteristic with a respective parameter set of a plurality of predetermined parameter sets. Detecting, with a control unit, an instantaneous working condition of the agricultural tractor. Selecting a parameter set from the plurality of predetermined parameter sets based on the detected instantaneous working condition; and activating an actuating device based on the selected parameter set to adapt a steering characteristic to the detected instantaneous working condition.

In other words, the steering characteristic is adapted specifically to the respective working situation of the agricultural tractor by suitable activation of the actuating device. Each of the predetermined parameter sets is associated with a defined steering characteristic. The parameter sets can be specified such that they cover the working situations typically occurring in everyday operation of the agricultural tractor.

each of the predetermined parameter sets is preferably characterized on the part of the control unit by one or more individual parameters, wherein the individual parameters are provided by a variable steering transmission ratio between the steering wheel and the steerable tractor wheels and/or an operating force of variable magnitude superimposed on the steering wheel operation force and/or a variable position of steering-limiting end stops.

For example, the steering transmission ratio describes the ratio between a steering angle resulting from the position of the steering wheel and the wheel positioning angle produced at the steerable tractor wheels. The operating force that can be superimposed by means of the actuating device leads to a steering resistance that makes steering wheel operation more difficult, or to one that facilitates steering, depending on the sign of the actuating force. The latter can be produced by the actuating device by means of a decreasing steering resistance. In the simplest case, the steering-limiting end stops are formed by mechanical stop elements, the position of which can be varied by means of the actuating device. On the other hand, these stops can also be simulated by the actuating device by building up steeply increasing operating forces in the respective end stop area. It should be noted that because the exemplary steering interventions are exhibited under the effect of an operating force exerted by the driver on the steering wheel, they are passive in nature.

In contrast to actively performed steering interventions, as provided in autonomous vehicle control systems, the driver must always actively intervene to correct the steering of the agricultural tractor. In that respect, the steering interventions carried out according to the selected parameter set have a merely driver-supporting (haptic) indication character.

Typically, the instantaneous working condition is detected by the control unit with respect to the presence of operating information related to the performance of transportation, field and/or loading work by the agricultural tractor.

The operating information can be, for example, cartographic information, the operating status of an implement attached to the agricultural tractor, information regarding the type of the implement, the instantaneous travel speed of the agricultural tractor, the activation status of a headland management system, a driving lane to be held on the field and the like. The relevant data is available to the control unit on a CAN data bus of the agricultural tractor, for example, or an ISOBUS communicating with an implement controller.

On the basis of cartographic information and by comparison to the instantaneous position of the agricultural tractor, it can thus be inferred that a road is being driven on, including the type of road, and thus that road transport travel is being carried out. A travel speed typical of road transport travel by the agricultural tractor can also be used as an indicator. The steering characteristic is adapted in this case by means of the actuating device such that a steering resistance.
is built up that increases with the steering wheel deflection and the instantaneous travel speed. Since abruptly performed steering wheel operations are damped, this has a stabilizing effect on the driving properties of the agricultural tractor. It is also conceivable to reduce the steering transmission ratio, so that a correspondingly mild driving behavior is achieved.

On the other hand, if it is inferred by comparing the cartographic information to the instantaneous position of the agricultural tractor that a field is being driven on, and further that certain fieldwork is being carried out on the basis of the operating status of an implement attached to the agricultural tractor, the nature of which work in turn results from the implement type in question, then it is desirable to stay on track as precisely as possible in order to achieve uniform working results.

The steering characteristic can be adapted such that the steering transmission ratio is reduced to suppress excessive steering movements, a virtual locking position corresponding to the track to be held is built up by generating an operating force sink on the steering wheel and/or a steering deflection away from the track to be held is suppressed by building up an increasing steering resistance, or holding the track is facilitated by building up a steering resistance in the opposite steering direction. The driving track to be held is derived from cartographic information and from the instantaneous position of the agricultural tractor, whereas the operating status of the implement can be derived from the position of a three-point implement hitch, the operating state of associated hydraulic control valves (SCVs) or a power takeoff shaft for operating the attached implement. In the headland, i.e. when turning the agricultural tractor at the edge of the field, different requirements apply. For example, in order to assist the driver in carrying out the turning process, an increased steering transmission ratio to improve maneuverability is advantageous, especially with an activated headland management system.

Usage in connection with loading work with a front loader mounted on the agricultural tractor is also conceivable. Here as well, an increased steering transmission ratio is advantageous in the interest of improved maneuverability of the agricultural tractor, whereas the transmission ratio should be reduced in the case of constricted space conditions within a shed or the like, and the variable position of the steering-limiting end stops on the steering wheel can also be restricted if necessary. With the appropriate cartographic information, it is not difficult to detect whether the agricultural tractor is outdoors or in a shed at a given time.

Apart from the above-presented automated selection of the parameter set, it is also possible for the instantaneous working condition of the agricultural tractor to be manually input by the driver via an operating unit, in which case the control unit detects the input, and then the associated parameter set with the appropriate adaptation of the steering characteristic is selected. For example, in some embodiments, the parameter set selected corresponding to the instantaneous working state can be manually initiated via an (additional) operating unit. The relevant parameter set is offered by the control unit in the form of an appropriate suggestion on a display that includes the operating unit. The driver can then activate the parameter set in question to carry out the actual steering intervention by confirming the suggestion via the operating unit.

Alternatively, there is also the possibility of initiating the parameter set selected according to the instantaneous working condition by the control unit independently of the driver. For this purpose, the control unit can be switchable via the operating unit between a semi-automatic mode with manual activation of the steering interventions, and a fully automatic mode with automatic activation.

In other embodiments, it is also possible for the selected parameter set to be configured via an (additional) operating unit with respect to at least one individual parameter within the predetermined limits and thus corresponding to individual preferences. Limits to the configurability are set, among other things, by considerations of traffic and operating safety of the agricultural tractor and an attached implement.

Other features and aspects will become apparent by consideration of the detailed description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION OF THE DRAWINGS

Figure 1:
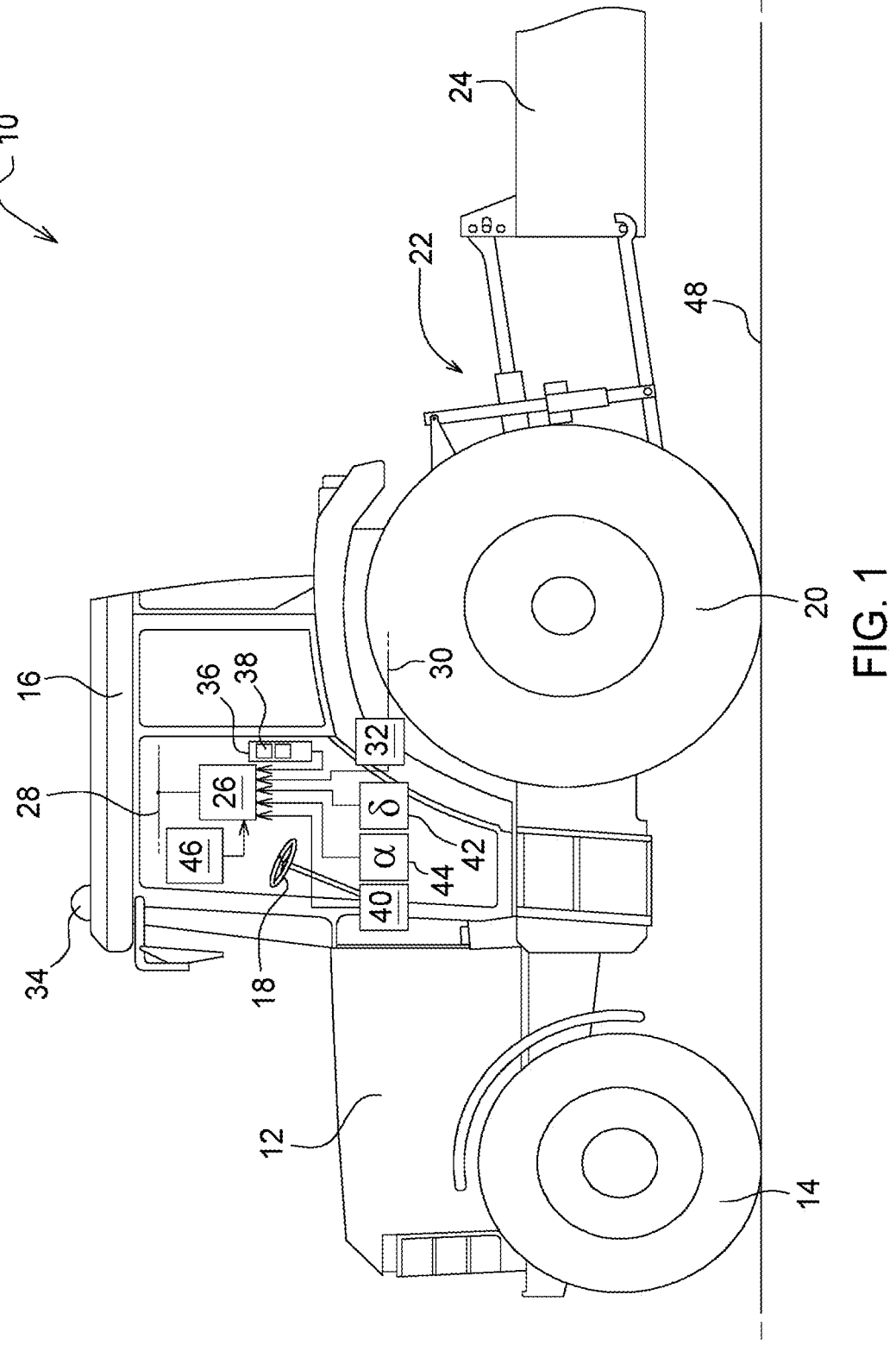
FIG. 1 is an illustration of a vehicle environment according to an embodiment.

Referring to FIG. 1, an exemplary embodiment of a vehicle environment 10 is shown, in which the method according to the present disclosure is performed. In FIG. 1, the vehicle environment 10 is schematically shown as comprising an agricultural tractor 12 having steerable front wheels 14, a steering wheel 18 arranged in a driver's cab 16, driven rear wheels 20, and a three-point implement hitch 22, to which an implement 24 is attached. A processor-controlled control unit 26 may also be arranged in the driver's cab 16 and is a component of a control device architecture (e.g., as indicated by a CAN data bus 28) of the agricultural tractor 12. The control unit 26 is connected to a data bus 30 (e.g., ISOBUS) of an attached implement controller 32, a GPS receiver 34 for determining the instantaneous position of the agricultural tractor 12, an operating unit 36 with a built-in display 38 (e.g., a touch-sensitive video screen), an actuating device 40 for adapting the steering characteristics of the vehicle steering system according to a selectable.

parameter set, a steering angle sensor 42 for detecting a steering wheel angle a, a wheel positioning angle sensor 44 for detecting the wheel positioning angle 8, and a storage unit 46 for cartographic information. The stored cartographic information can include information relating to the topography and/or nature of the ground 48 being driven upon, as well as the contour and type of public roads, working roads or field areas.

Figure 2:
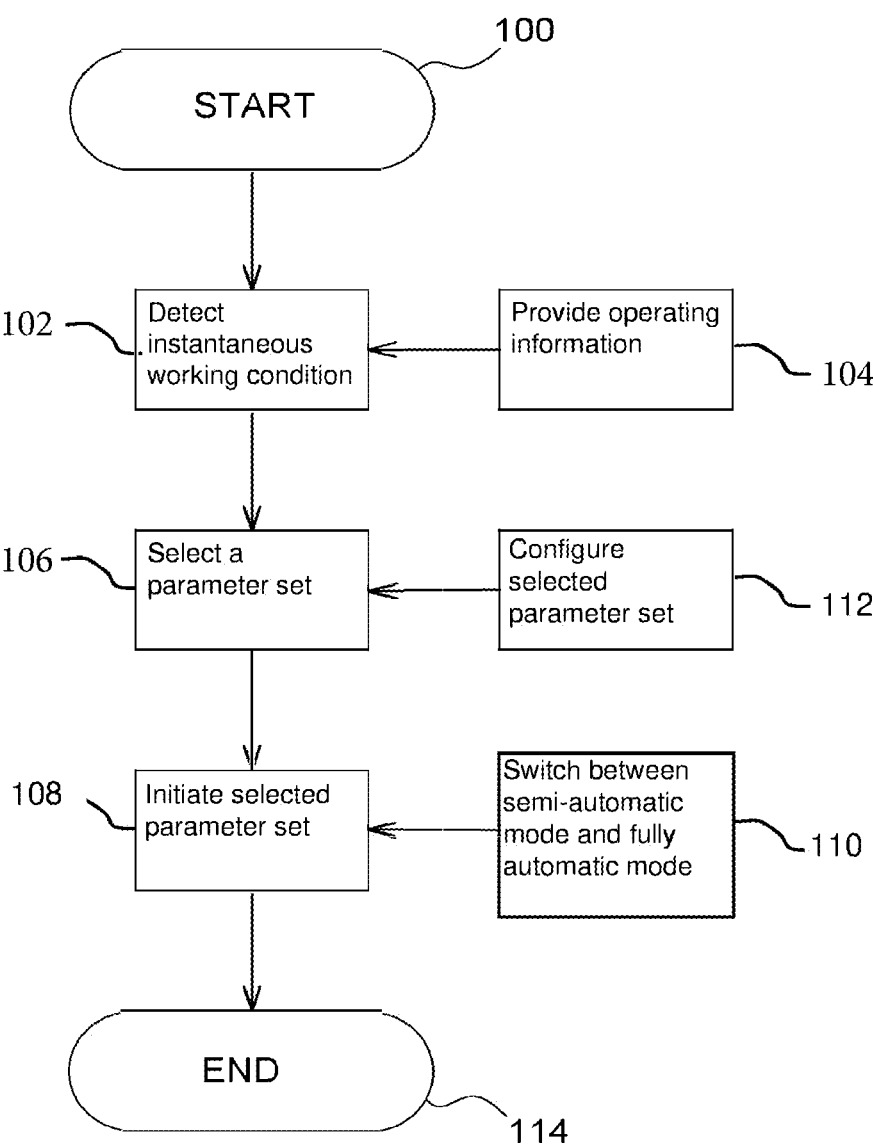
FIG. 2 is a flow diagram of a method for influencing steering characteristics.

Referring to FIG. 2, a flow diagram of a method 100 is shown. A process running in the control unit 26 is started in an initialization step 100 upon putting the agricultural tractor 12 into operation, or manually via the operating unit 36. Then, an instantaneous working condition of the agricultural tractor 12 with respect to the presence of operating information relating to the performance of transportation, field, and/or loading work of the agricultural tractor 12 is detected by the control unit 26 in a first main step 102.

The operating information can be provided in a first auxiliary step 104 and can include, without limitation, cartographic information stored in the storage unit 46, the operating status of an implement 24 attached to the agricultural tractor 12, information regarding the type of implement, the instantaneous travel speed of the agricultural tractor 12, the activation status of a head-land management system, a working track to be held on the field, or other suitable data. The relevant data is available to the control unit 26 on a CAN data bus 28 of the agricultural tractor 12, or an ISOBUS 30 communicating with an implement controller 32.

In a second main step 106, a parameter set for adjusting the steering characteristics of the agricultural tractor 12 specifically for the instantaneous working condition is selected by the control unit 26 from a plurality of predetermined parameter sets stored in the storage unit 46. Each of the predetermined parameter sets is characterized on the part of the control unit 26 by one or more individual parameters, wherein the individual parameters are provided by a variable steering transmission ratio between the steering wheel 18 and the steerable front wheels 14, an operating force of variable magnitude superimposed on the steering wheel operating force, and/or a variable position of steering-limiting end stops. It should be noted that, in some embodiments, the various individual parameters can be representative of passive steering interventions that can be carried out by means of the actuating device 40.

For example, the steering transmission ratio can comprise a ratio between a steering angle a resulting from the position of the steering wheel 18 and the wheel positioning angle 8 produced at the steerable tractor wheels 14. The operating force, which can be superimposed by means of the actuating device 40, leads to a steering resistance making steering wheel operation more difficult or to one facilitating steering, depending on the sign of the actuating force. The latter can be produced by the actuating device 40 by means of a decreasing steering resistance. Additionally, in some embodiments, the steering-limiting end stops can be formed by mechanical stop elements, the position of which can be varied by means of the actuating device 40. Alternatively, these stops can be simulated by the actuating device 40 by building up steeply increasing operating forces in the respective end stop area.

The parameter set selected in the second main step 106 by the control unit 26 according to the instantaneous working condition can be initiated manually via the operating unit 36 in a third main step 108. The relevant parameter set is offered by the control unit 26 in the form of an appropriate suggestion on the display 38 comprised by the operating unit 36. The driver can then activate the parameter set in question to carry out the actual steering intervention by confirming the suggestion via the operating unit 36.

Alternatively, there is also the possibility in the third main step 108 that the parameter set selected according to the instantaneous working condition can be initiated by the control unit 26 independently of the driver. For this purpose, the control unit 26 is switchable via the operating unit 36 between a semi-automatic mode with manual activation of the steering interventions, and a fully automatic mode with automatic activation. The changeover takes place in a second auxiliary step 110.

It should be noted, however, that is possible in either step 106 or 108 for the selected parameter set to be configured in a third auxiliary step 112 via the operating unit 36 with respect to at least one individual parameter within the predetermined limits and thus corresponding to individual preferences. Limits to the configurability are set, among other things, by considerations of traffic and operating safety of the agricultural tractor 12 and an attached implement 24. Then, in a final step 114, the method according to the present disclosure is terminated by the control unit 26.

Apart from the above-presented automated selection of the parameter set, it is also possible for the instantaneous working condition of the agricultural tractor 12 to be manually input by the driver via an operating unit 36 in the first main step 102, in which case the control unit 26 detects the input and then the associated parameter set with the appropriate adaptation of the steering characteristic is selected in the second main step 106.

With respect to the adaptation of the steering characteristics, various working situations are possible. For example, based on the stored cartographic information and a comparative analysis of the instantaneous position of the agricultural tractor 12, it can thus be inferred by the control unit 26 in the first main step 102 that a road is being driven on, including the type of road, and thus that road transport travel is being carried out. The control unit 26 additionally uses a travel speed of the agricultural tractor 12 that is typical of road transport travel as an indicator. The steering characteristic is adapted in this case by means of the actuating device 40 in the third main step 108 such that a steering resistance is built up that increases with the steering wheel deflection and the instantaneous travel speed. Damping of abruptly performed steering wheel operations has a stabilizing effect on the driving properties of the agricultural tractor 12. In addition, the steering transmission ratio is reduced, so that a correspondingly mild driving behavior is achieved.

On the other hand, if it is inferred in the first main step 102 by comparing the cartographic information to the instantaneous position of the agricultural tractor 12 that a field is being driven on, and further that certain fieldwork is being carried out on the basis of the working condition of the implement 24 attached to the agricultural tractor 12, the nature of which work in turn results from the implement type in question, then it is desirable to stay on track as precisely as possible in order to achieve uniform working results. The steering characteristic can then be adapted in the third main step 108 by appropriate activation of the actuating device 40 such that the steering transmission ratio is reduced to suppress excessive steering movements, a virtual locking position corresponding to the track to be held is built up by generating an operating force sink on the steering wheel 18, and/or a steering deflection away from the track to be held is suppressed by building up an increasing steering resistance, or holding the track is facilitated by building up a steering resistance in the opposite steering direction. The driving track to be held is derived from carto-graphic information and from the instantaneous position of the agricultural tractor 12, whereas the working condition of the implement 24 can be derived by the control unit 26 from the position of a three-point implement hitch 22, the operation state of associated hydraulic control valves (SCVs) or a power takeoff shaft for operating the attached implement 24. The corresponding information is available to the control unit 26 on the CAN data bus 28.

In the headland, i.e. when turning the agricultural tractor 12 at the edge of the field, different requirements apply. In order to support the driver when carrying out the turning process, an increased steering transmission ratio for improving maneuverability is provided in the third main step 108 if headland management has been activated in the first main step 102.

An increased steering transmission ratio is also preferred in relation to loading work detected in the first main step 102 with a front loader mounted on the agricultural tractor 12, with regard to an improved maneuverability of the agricultural tractor 12, while the steering transmission ratio can be reduced in the third main step 108 of the control unit 26 by appropriate activation of the actuating device 40 in the event of constricted spatial conditions, and the variable position of the steering-limiting end stops on the steering wheel 18 can be narrowed if needed. Based on the relevant cartographic information, the control unit 26 detects without difficulty in the first main step 102 whether the agricultural tractor 12 is outside or inside a shed at a given time.

Without in any way limiting the scope, interpretation, or application of the claims appearing below, a technical effect of one or more of the example embodiments disclosed herein is a method for influencing the steering characteristics of an agricultural tractor. It should be noted that the use of the described method is fundamentally also possible with any other agricultural utility vehicle. It is of particular advantage in tractors, however, due to their versatile usage possibilities. Furthermore, the vehicle steering system can be a steer-by-wire steering, but it can also have a conventional design.

While the above describes example embodiments of the present disclosure, these descriptions should not be viewed in a limiting sense. Rather, other variations and modifications may be made without departing from the scope and spirit of the present disclosure as defined in the appended claims.

The invention claimed is:

1. A method for influencing steering characteristics of an agricultural tractor, the method comprising:

associating a steering characteristic with a respective parameter set of a plurality of predetermined parameter sets, wherein the plurality of predetermined parameter sets comprise individual parameters defining a variable position of steering-limiting mechanical end stops and an operating force of variable magnitude superimposed on a steering wheel operation to affect a steering resistance that changes an amount of force to affect the steering wheel operation;

detecting, by a control unit, an instantaneous working condition of the agricultural tractor;

selecting a parameter set from the plurality of predetermined parameter sets based on the detected instantaneous working condition; and adapting a steering characteristic to the detected instantaneous working condition based on the selected parameter set.

2. The method of claim 1, wherein each of the plurality of predetermined parameter sets are characterized by additional individual parameters defined by a variable position of steering-limiting end stops formed by repositionable mechanical stop elements.

3. The method of claim 1, wherein the instantaneous working condition is detected by the control unit with respect to a presence of operating information related to a performance of transportation, field, or loading work by the agricultural tractor.

4. The method of claim 1, wherein the instantaneous working condition of the agricultural tractor can be input manually by a driver via an operating unit.

5. The method of claim 1, wherein the parameter set corresponding to the instantaneous working condition can be initiated manually by an operator of the agricultural tractor via an operating unit.

6. The method of claim 1, wherein the parameter set selected according to the instantaneous working condition can be initiated by the control unit independently of a driver.

7. The method of claim 1, wherein the selected parameter set can be configured manually within predefined limits via an operating unit with respect to at least one individual parameter.

8. The method of claim 1, wherein each of the plurality of predetermined parameter sets are characterized by additional individual parameters defined by a variable position of steering-limiting end stops formed by steeply increasing operating forces in the respective end stop areas.

* * * * *